May 6, 1930.                G. A. GRAB                 1,757,798
                         TRAVERSING HOIST
                       Filed May 4, 1927            4 Sheets-Sheet 4
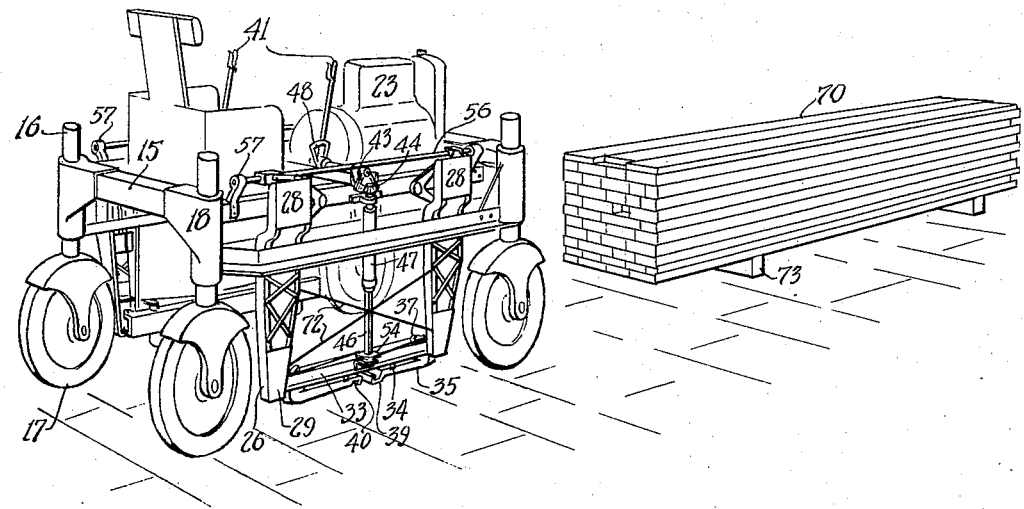
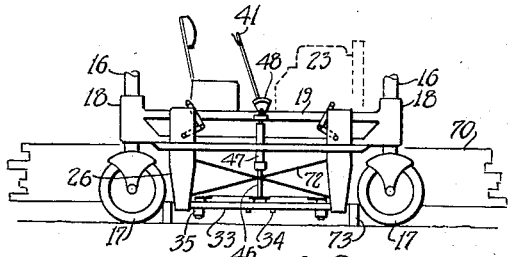
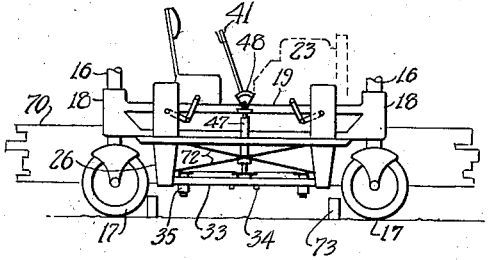
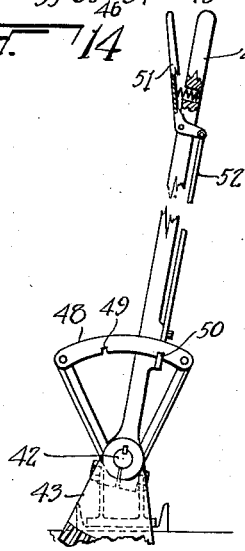
INVENTOR
G. A. Grab
BY E. B. Birkenbeuel
ATTORNEY Patented May 6, 1930

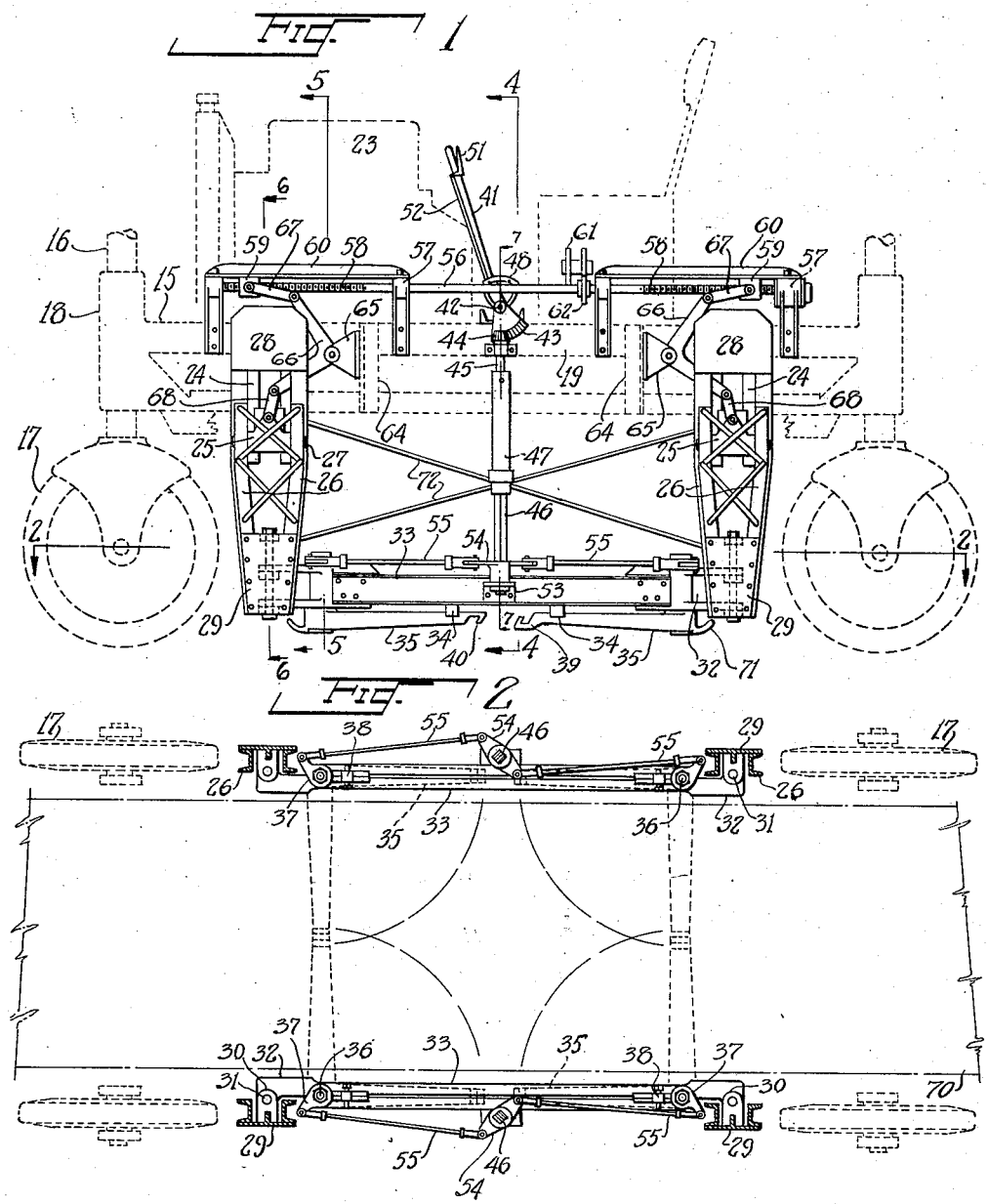

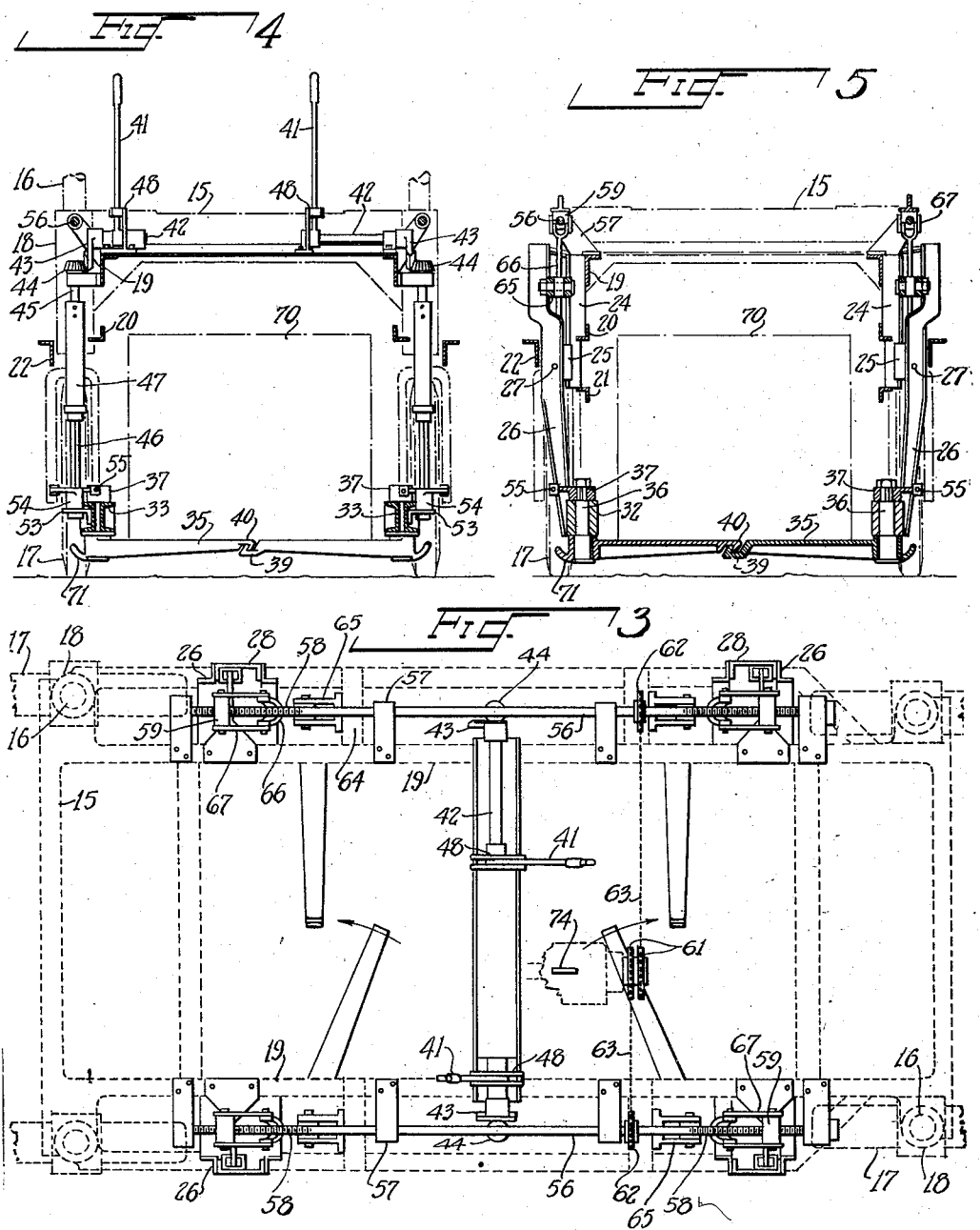

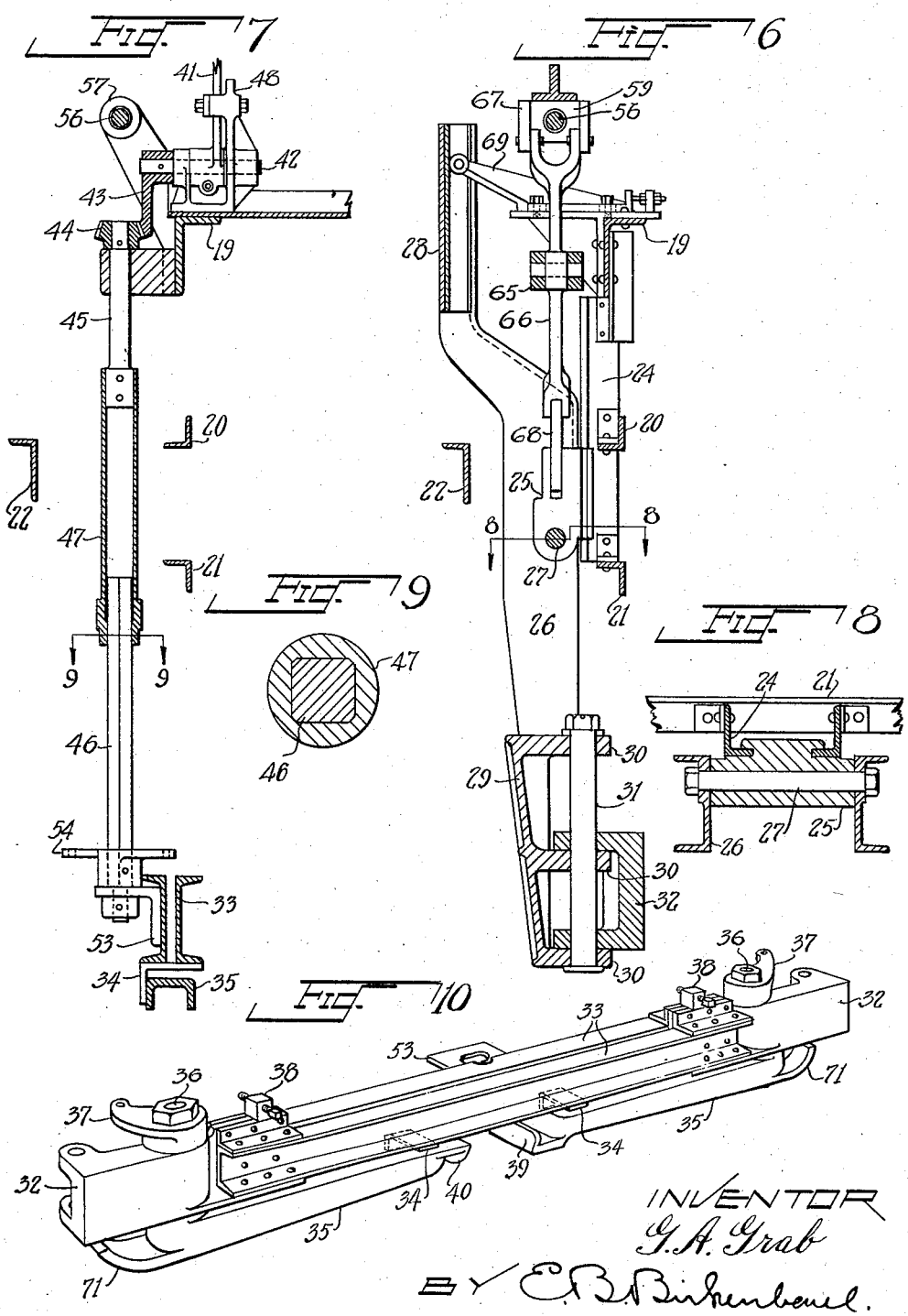

1,757,798

UNITED STATES PATENT OFFICE

GUSTAV A. GRAB, OF PORTLAND, OREGON, ASSIGNOR, BY MESNE ASSIGNMENTS, TO WILLAMETTE-ERSTED COMPANY, OF PORTLAND, OREGON

TRAVERSING HOIST

Application filed May 4, 1927. Serial No. 188,796.

This invention relates generally to land vehicles, and particularly those intended to operate without tracks and with special reference to the straddle type of vehicle whereby the load is picked up bodily and transported and then replaced upon supports.

The first object of this invention is to construct a carrier for lumber, boxes, crates and similar objects which are supported on fixed bolsters or bunks not ordinarily intended to be moved from place to place.

The second object is to construct a special form of lumber carrier peculiarly adapted to use in conjunction with certain types of overhead carriers in which the supporting member is part of the carrier itself.

The third object is to reduce the cost of transporting lumber by eliminating the necessity of having a great quantity of bolsters which require constant repairing, moving about and rearrangement in order to successively use same for the purpose intended.

The fourth object is to provide load-supporting members having more road clearance for a given lift than do the ordinary wooden bunks, thereby reducing the chances of breakage by encountering obstructions and also by employing this member as a tie across the open end of the hoist, thereby completely removing the tremendous strains ordinarily imposed on the arched back of the vehicle.

The fifth object is to provide a special form of carrier which will be easily interchangeable from the form herein described to the form illustrated in my application, Serial No. 171,748.

The sixth object is to so construct the hoist so that its members which are intermittently in and out of engagement, such as the load supporting members, can always be held in positions whereby they can easily engage their associated parts. This is accomplished by special adjustments provided therefor.

The seventh object is to provide a special form of an ordinary yielding load support which will not require the raising of the entire load-lifting mechanism whenever an obstruction is encountered or passes over and comes into actual contact with the bottom of the load-supporting mechanism.

These, and other objects, will become more apparent from the the specification following as illustrated in the accompanying drawings, in which:

Figure 1 is a side elevation of the hoist of which Figure 2 is a horizontal section taken along the line 2—2 in Figure 1. Figure 3 is a plan of the vehicle showing its load supports partially in position and partially being placed in position. Figure 4 is a vertical transverse section taken along the line 4—4 in Figure 1 but showing the load supports in position for sustaining a load. Figure 5 is a vertical transverse section taken along the line 5—5 in Figure 1. Figure 6 is an enlarged vertical section taken along the line 6—6 in Figure 1. Figure 7 is a vertical section taken along the line 7—7 in Figure 1. Figure 8 is a horizontal section taken along the line 8—8 in Figure 6. Figure 9 is a horizontal section taken along the line 9—9 in Figure 7. Figure 10 is a perspective view of the grapple unit whose members support the load. Figure 11 is a perspective view of the entire vehicle showing same about to pick up a load of lumber. Figure 12 is a small side elevation showing the vehicle straddling the load showing the grapples in their transverse position ready to pick up the load. Figure 13 is a similar view but showing the load elevated ready for transportation. Figure 14 is an enlarged side elevation of a grapple control lever including stops for the grapples in their transverse and longitudinal positions.

Similar numbers of reference refer to similar parts throughout the several views.

Referring in detail to the drawings, there is illustrated an arched frame 15 on whose steering spindles 16 are mounted the wheels 17. The frame corners 18 are joined longitudinally by the angular ties 19, 20, 21 and 22, as more fully set forth in my co-pending application, Serial No. 181,456.

On the top of the vehicle is mounted an engine 23 which furnishes power for moving the vehicle and for handling its loads.

Vertically secured to the members 19, 20 and 21 are the upright angles 24, which face each other in pairs near each corner of the machine. The members 24 act as gudies for the vertical slide 25 to whose outer side is attached the vertical members 26 of the load-lifting frame. The members 26 are preferably trussed for stiffening purposes and are pivotally supported on the pin 27, which passes through the member 25. The members 26 are joined at their upper end by the plate 28 and at their lower end by the member 29 in whose inwardly turned ears 30 is carried a vertical pin 31 which receives the channel-shaped end 32 of the grapple unit. The member 32 is held in its lowermost position by gravity. The members 32 are joined by the two longitudinal channel members 33 which, besides acting as a tie in the members 26, also carry the stops 34, which limit the outward movement of the grapples 35, each of which is pivoted on a shouldered pin 36 in the member 32.

On the upper end of each pin 36 is placed a short lever 37 by means of which the grapples 35 are operated. Adjustable stops 38 limit the inward or transverse movement of the grapples 35 and insure their proper relation when the operating mechanism is moved to its limit in one direction. The grapples 35 differ from each other only in the fact that they are right and left, and one of each lateral pair having an upturned end 39 and the other having a downturned end 40. The ends 39 and 40 have slight backward bends to insure their proper relation when supporting a load.

In order to operate the grapples 35 there are provided the two hand levers 41, each of which is mounted on a rock shaft 42 and carries the segment gear 43 which meshes with the pinion 44 on the upper end of the vertical shaft 45 which is joined to the square shaft 46 by means of the sleeve 47 in which the square shaft 46 can slide. Each lever 41 is provided with a quadrant 48 whose notches 49 receive the pawl 50 in its extreme position. The pawl 50 is raised out of its notch 49 by means of the hand trip 51 and its connecting rod 52 which is joined to the pawl 50.

On a member 33 is secured an angular lip 53 whose lower end supports the lever 54 whose connecting rods 55 join same to the levers 37.

Above the pins 27 is mounted a longitudinal shaft 56 which journals in the bearings 57 which, in turn, are mounted on the ties 19. The opposite ends 58 of the shaft 56 are threaded to receive the traveling nuts 59 which are prevented from rotation by the guide 60 secured across each end pair of bearings 57. Motion is transmitted to the shafts 56 by means of the sprockets 61 and 62 and the chain 63.

On the vertical ties 64 are mounted the brackets 65 for the bell crank levers 66 whose free ends are joined to the nuts 59 by means of the connecting link 67 and whose lower ends are joined to the vertical slide 25 by means of the link 68.

The upper end of each member 26 is provided with an adjustable connection 69 by means of which it can be held in its proper relation to the tie 19 and ultimately control the lateral position of the pins 36, making it possible to correctly position the grapple ends with relation to each other, thereby making it possible to positively insure their correct engagement, which is essential, since when the load 70 is supported on the grapples 35 they are placed in tension and were they not properly engaged they would tend to pull apart, with obvious bad effects on the frame 15.

Each grapple 35 has its pivoted end provided with an upturned shoe 71, which prevents same from digging into the planking of the roadways, or other obstructions, and causes the grapple unit to yield instead of trying to raise the load-lifting mechanism or the vehicle itself, which would be the case if the vertical yielding grapple hook were not provided.

Attention is also drawn to the braces 72 which provide longitudinal rigidity to the load-lifting mechanism.

In operation it is necessary to employ a supporting bunk 73 for the load 70 which makes it possible to move the grapples 35 underneath the load by the manipulation of the hand levers 41. The grapples having engaged each other as shown in dotted lines in Figure 2, the load-lifting mechanism is now operated by moving the lever 74 from a power take-off, such as is now in common use. This power take-off must obviously be reversible since it is necessary to lower the lifting mechanism as well as raise it. Such reversible power take-off units are now common in the market and need not be described here.

The load having been raised (as shown in Figure 13) the driver merely moves the vehicle to the desired point and sets his load down upon another pair of bunks, which will release the grapples 35 and permit same to be returned to a longitudinal position.

In many instances where overhead systems are employed for the transportation of lumber and similar objects, the load is supported on fixed beams which form a part of the vehicle. The hoist herein described is of special value where such overhead handling devices are also employed, since both require the use of fixed or stationary supports or bolsters.

While the grapples herein described are illustrated as moved in pairs by means of separate levers through segment gears and pinions with the aid of levers and connecting rods, it can be seen that there are countless ways in which the grapples can be swung inwardly from the side frames, either successively or separately, without departing from the spirit of this invention.

I claim:

1. A traversing hoist having, in combination a wheeled frame adapted to straddle a load; pairs of horizontal swinging grapples hinged to the sides of said frame having means on their swinging ends for attaching said grapples to each other in a manner to place same in tension when a load is placed thereon.

2. A traversing hoist having in combination a wheeled straddle frame, a plurality of load-engaging grapples hinged thereto adapted to swing laterally in a horizontal plane across the under side of a load, means for raising said grapples with relation to said frame, and means for uniting the swinging ends of said grapples to form a tension member.

3. In a traversing hoist the combination of a wheeled high arch frame having a load-lifting mechanism on each side of said frame, each of said load-lifting mechanisms having horizontal grapples hinged thereto on vertical axes and adapted to be swung laterally and horizontally across said frame for the purpose of supporting a load across its entire width, and hooks formed on the swinging end of said grapples for uniting same longitudinally.

4. A load supporting mechanism for traversing hoists consisting of a pair of arms having their ends hinged to the sides of said hoist and having means for swinging same transversely across said hoist to a load supporting position, the swinging ends of said arms having hook ends formed thereon adapted to engage each other when in a transverse position; and means for adjusting said arms to cause same to lie in the same vertical and horizontal plane just prior to engagement of the hook ends.

5. A traversing hoist having, in combination, a wheeled straddle frame; pendant sides for said frame; a grapple arm frame yieldingly mounted in the bottom of each pendant side; a pair of horizontal grapple arms pivotally mounted on each grapple frame; means for swinging said grapple arms transversely across said hoist; means for uniting the ends of said arms in a manner to convert same into tension members; and means for raising said grapple frames in unison.

6. A traversing hoist having, in combination, longitudinally rigid side frames, each of said side frames having a horizontal grapple arm hinged near each end thereof adapted to be swung transversely with said frame into engagement with a corresponding arm in a manner to form two continuous supports across the open lower end of said hoist frame, said grapple arms having means for joining their ends for the purpose of tying the lower ends of said side frames together, said grapple arms having vertically yieldable supports for connecting same to said side frames; lifting means for raising all of said grapple arms in unison; and swinging means whereby said arms can be moved into lateral or transverse positions.

GUSTAV A. GRAB.